UNITED STATES PATENT OFFICE.

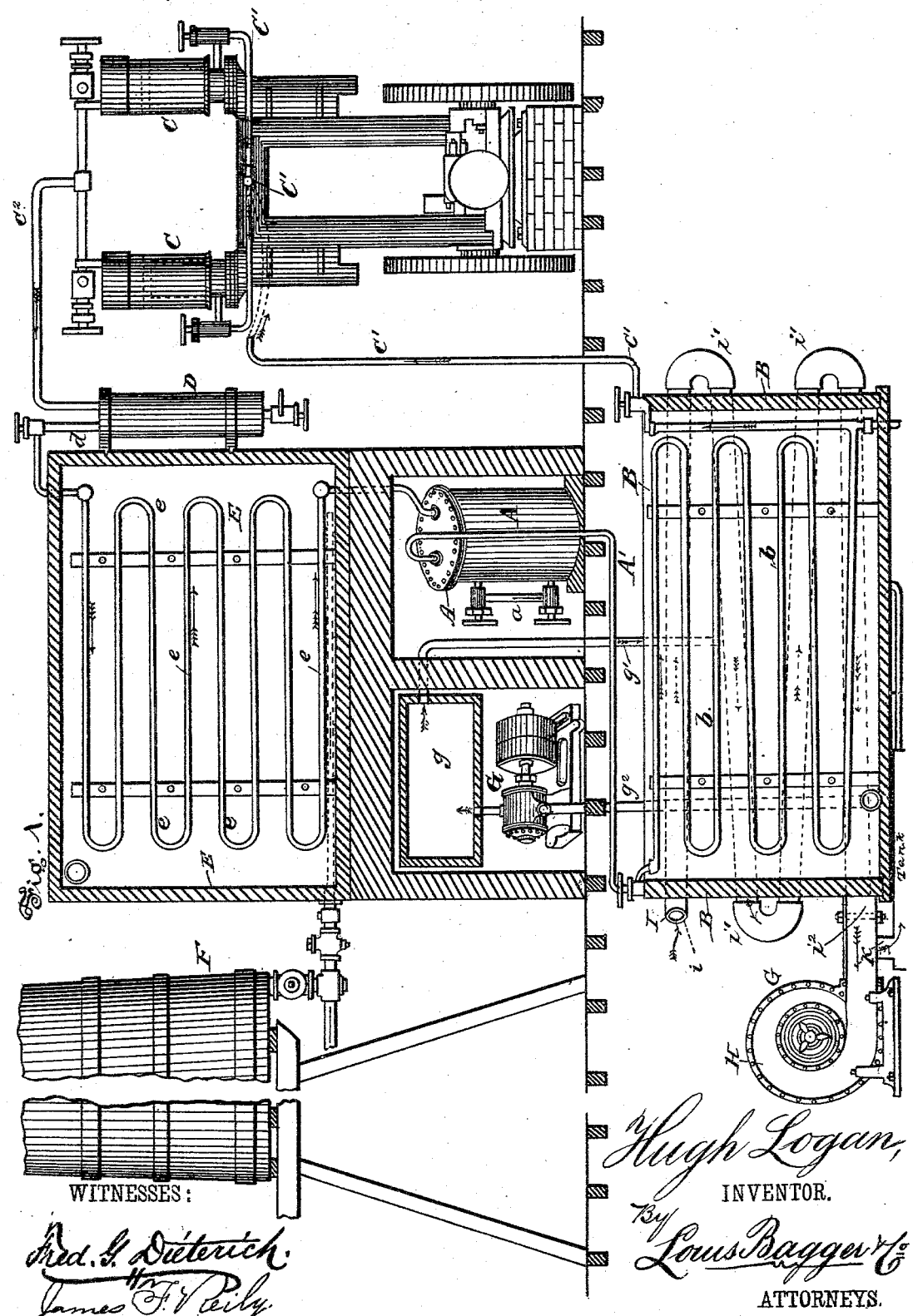

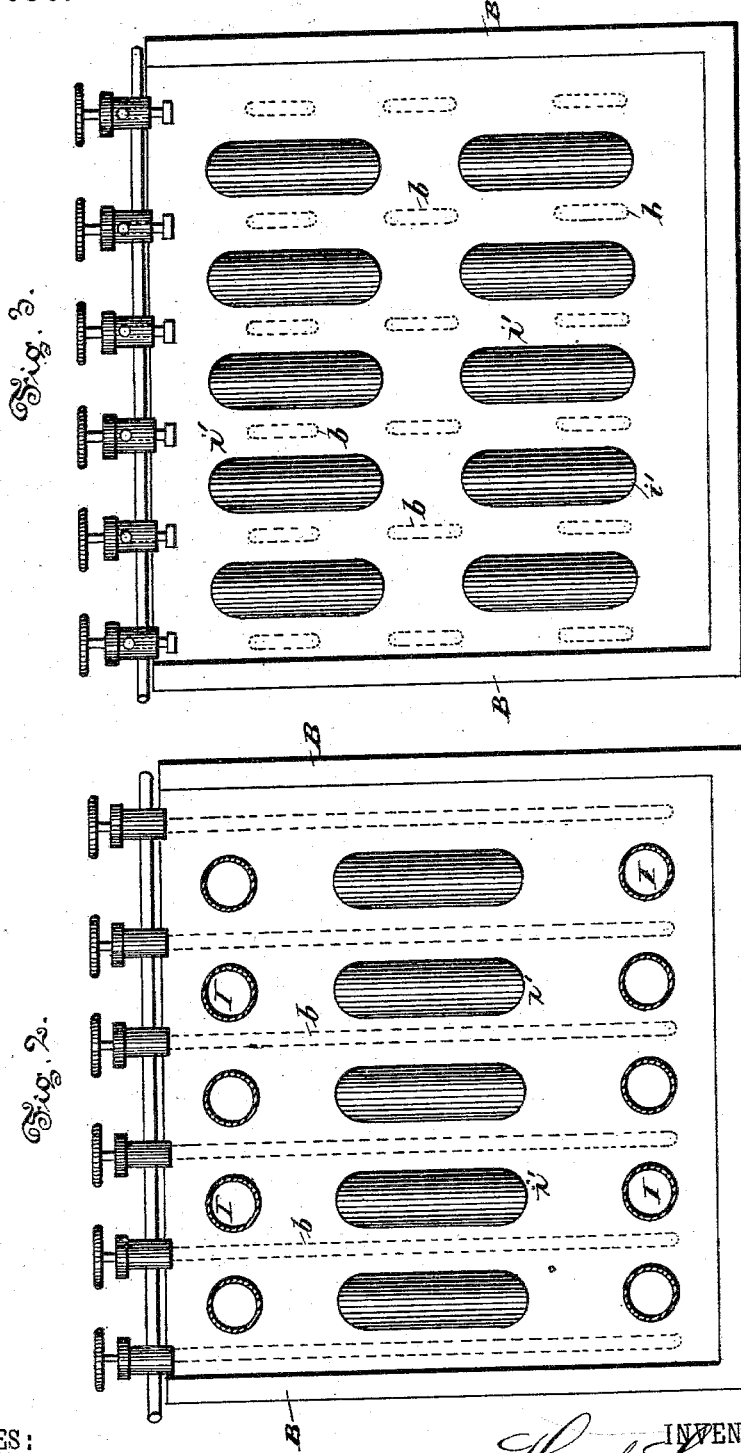

HUGH LOGAN, OF SAN FRANCISCO, CALIFORNIA.

REFRIGERATING AND ICE MACHINE.

SPECIFICATION forming part of Letters Patent No. 281,090, dated July 10, 1883.

Application filed January 31, 1883. (No model.)

*To all whom it may concern:*

Be it known that I, HUGH LOGAN, of San Francisco, in the county of San Francisco and State of California, have invented certain new and useful Improvements in Refrigerating and Ice Machines; and I do hereby declare that the following is a full, clear, and exact description of the invention, which will enable others skilled in the art to which it appertains to make and use the same, reference being had to the accompanying drawings, which form a part of this specification.

My invention relates to that class of ice-machines or refrigerating-machines in which cold is generated by the process of vaporization of ammonia, ether, benzole, &c., which, in assuming the vaporous form, change sensible heat to latent, extracting it from the objects most convenient thereto—such as water, brine, or any non-congealable liquid, according to the purposes for which the machine is to be used—*i. e.*, as an ice-machine or machine for manufacturing ice, or as a refrigerating-machine for cooling the air of store-rooms, beer-vaults, railway-cars, the holds of steamships, &c. My machine is adapted to either and all of these purposes, and, owing to the simplicity of its construction, it can be made and put up at a small expense, as well as run at a minimum of cost.

My invention consists in the combination of a refrigerating tank or vat adapted to contain a non-congealable liquid, a pipe-worm immersed into the liquid in the refrigerator-vat, and adapted to convey ammonia gas or vapor or its equivalent through the same, a series of air-pipes passing through the vat and connected to one another by couplings, a reservoir for containing the non-congealable liquid which is supplied to the refrigerating vat or tank, and a pump for maintaining a continuous circulation of the non-congealable liquid between the vat and the supply-reservoir, all as hereinafter more fully described and claimed.

On the accompanying two sheets of drawings, Figure 1 is a side elevation, partly in section, of my improved apparatus. Fig. 2 is an end view of the refrigerator-tank with its air-pipes, and Fig. 3 is an end view of the opposite side of the same.

Similar letters of reference indicate corresponding parts in all the figures.

The ammonia or other liquid to be vaporized is contained in a closed tank, A, preferably made of boiler-iron, and provided with a gage-glass, $a$.

C designates the cylinders of the gas-pump or compression-pump, which may be of any approved construction, and is provided with an inlet-pipe, $C'$, and outlet $C^2$. In the present illustration of my machine I have shown a compression-pump having two cylinders, and pipes $C'$ and $C^2$ are therefore branched, each branch being provided with suitable valves and stop-cocks for controlling and regulating the flow through them. By the compression-pump the ammonia is pumped into the oil-receiver D, from which it passes through pipe $d$ into the coil or worm $e$ of the condenser E, which is kept filled with cold water from a tank, F, and is provided with a suitably-arranged overflow. A constant pressure being maintained by the operation of the compression-pump, the ammonia passes from the condenser into the ammonia-tank A and out through pipe $A'$ into the refrigerator vat or tank B. The latter consists of a tank containing a pipe-coil, $b$, and filled with a non-congealable fluid composed, by preference, of a mixture of nitrate of ammonia and nitrate of sodium in certain proportions, which by their combination are capable of producing a very low degree of temperature. This mixture is kept constantly circulating through the refrigerator-vat by means of a circulating-pump, G, of any approved construction, which is supplied from a tank, $g$, the fluid being fed to the refrigerator through the pipe $g'$, and withdrawn from it into the supply-tank through pipe $g^2$.

I is an air-pipe, the inlet $i$ of which is near the top of the refrigerator and in one end thereof. This pipe is arranged in the refrigerator-vat, between the coils of the ammonia-worm $b$, and is provided with elbow-couplings $i'$, coupling or uniting its several lengths or sections outside of the tank, at both ends thereof, as clearly shown in the drawings. By removing the elbows the pipe-sections can readily be cleaned, when desired, without disturbing the refrigerating-tank, through which they are inserted.

At the outlet $i^2$ of the air-pipe, which is located near the bottom of the refrigerator-tank, is placed a Sturtevant blower, H, (or a fan-blower of any other desired make or construction may be used,) adapted to suck air through pipe I, as indicated by the arrow at its mouth. In its passage through the refrigerator-tank this air is cooled by the non-congealable freezing-mixture surrounding the pipe, which is kept at a constant low state of temperature by the ammonia-worm $b$, through which a flow is constantly kept from tank A by means of the compression-pump, which is kept in continuous operation.

The non-congealable liquid in tank B is kept at a uniform or even temperature by keeping it in constant circulation through the tank and the reservoir $g$ by means of pump G.

From the outlet $i^2$ of the air-pipe cold air is blown through a pipe, K, into the tank or room where it is desired to use it, either for freezing water in the manufacture of ice or for maintaining a steady low degree of temperature in storage-rooms or packing-houses in the treatment and packing of fresh meats, fish, and vegetables.

Having thus described my invention, I claim and desire to secure by Letters Patent of the United States—

In a refrigerating-machine or ice-machine, the combination of a refrigerating tank or vat adapted to contain a non-congealable liquid, a pipe-worm contained within the vat immersed in the liquid and adapted to convey ammonia-gas or its equivalent through the tank, a series of air-pipes passing through the vat and coupled together to form one continuous pipe, a reservoir for containing the non-congealable liquid supplied to the tank, suitable connecting-pipes between this reservoir and the tank, and a pump for maintaining a continuous circulation of the non-congealable liquid between the tank and its supply-reservoir, all substantially as and for the purpose shown and set forth.

In testimony that I claim the foregoing as my own I have hereunto affixed my signature in presence of two witnesses.

HUGH LOGAN.

Witnesses:
LEE D. CRAIG,
J. T. POMEROY.